(12) United States Patent
Ashelin et al.

(10) Patent No.: US 6,205,721 B1
(45) Date of Patent: Mar. 27, 2001

(54) SEALING APPARATUS FOR FORMING A WEATHER SEAL BETWEEN A VEHICLE AND A LOADING DOCK OR THE LIKE

(75) Inventors: Charles J. Ashelin; Thomas J. Boffeli, both of Dubuque; David J. Hoffmann, Peosta, all of IA (US)

(73) Assignee: Rite-Hite Holding Corporation, Milwaukee, WI (US)

(*) Notice: Subject to any disclaimer, the term of this patent is extended or adjusted under 35 U.S.C. 154(b) by 0 days.

(21) Appl. No.: 08/987,445

(22) Filed: Dec. 9, 1997

(51) Int. Cl.$^7$ .............................. E04H 14/00; E06B 5/00
(52) U.S. Cl. ............................................ 52/173.2; 52/2.12
(58) Field of Search .................................... 52/2.12, 173.2

(56) References Cited

U.S. PATENT DOCUMENTS

| | | |
|---|---|---|
| 3,230,675 | 1/1966 | Frommelt et al. . |
| 3,352,314 | 11/1967 | Frommelt et al. . |
| 3,375,625 | 4/1968 | Edkins et al. . |
| 3,538,655 | 11/1970 | Frommelt et al. . |
| 3,665,997 | 5/1972 | Smith et al. . |
| 3,826,049 | 7/1974 | Frommelt et al. . |
| 3,875,954 | 4/1975 | Frommelt et al. . |
| 3,939,614 | 2/1976 | Frommelt et al. . |
| 3,994,103 | 11/1976 | Ouellet . |
| 4,015,380 | 4/1977 | Chalfant . |
| 4,062,157 | 12/1977 | Potthoff . |
| 4,554,768 | 11/1985 | Srajer . |
| 4,571,903 | 2/1986 | Strassner . |
| 4,601,142 | 7/1986 | Frommelt . |
| 4,724,648 | 2/1988 | Diepholder . |
| 4,799,341 | 1/1989 | Frommelt et al. . |
| 4,873,801 | 10/1989 | Winters . |
| 5,125,196 | 6/1992 | Moody . |
| 5,185,977 | 2/1993 | Brockman et al. . |
| 5,195,285 | 3/1993 | Alten . |
| 5,282,342 | 2/1994 | Brockman et al. . |
| 5,622,016 | 4/1997 | Frommelt et al. . |
| 5,675,945 | 10/1997 | Giuliani et al. . |
| 5,775,044 | 7/1998 | Styba et al. . |

FOREIGN PATENT DOCUMENTS 24 36 518   8/1975   (DE) .

OTHER PUBLICATIONS

Blueprint No. D802–0176 for "*Rain Diverter Curtain*", Rite–Hite Model No. WG402, dated Jul. 1, 1992.
Blueprint No. 692–0125 for "*VHL Bottom Pads*", Frommelt Industries, Inc., dated Oct. 7, 1988.
Blueprint No. A204–0029 for "C–Curtain—Split Corners", Rite–Hite Model No. C–Curt., dated May 27, 1994.
"*Loading Dock Seal*" Brochure, Kinnear—Division of Harsco Corp., 4 pages (1978).
"*Dock Seal*" Installation Instructions, Kinnear—Division of Harsco Corp., 4 pp. (1978).
"*Super Seal Dock Seals*" Brochure, Super Seal Manufacturing, Ltd., 8 pages.

*Primary Examiner*—Christopher T. Kent
(74) *Attorney, Agent, or Firm*—Marshall, O'Toole, Gerstein, Murray & Borun

(57) ABSTRACT

A sealing apparatus for forming a weather seal between a vehicle and a loading dock is provided. In some embodiments, the apparatus includes a compressible seal and a support mounted for pivoting away from the top of an adjacent vehicle to facilitate exiting. In some embodiments, a stiffening member is located proximally to the seal to provide a compression force between the seal and the top of the vehicle. In other embodiments, the apparatus includes a deflectable seal and a locator including a distal recess for engaging the leading edge of a vehicle entering the parking area.

61 Claims, 14 Drawing Sheets

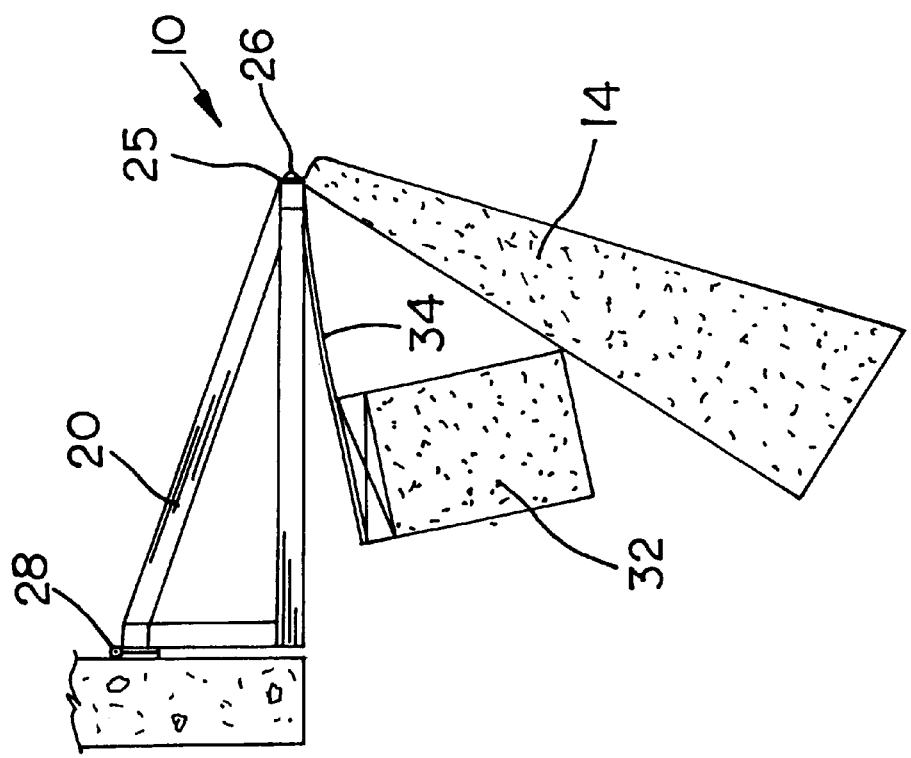
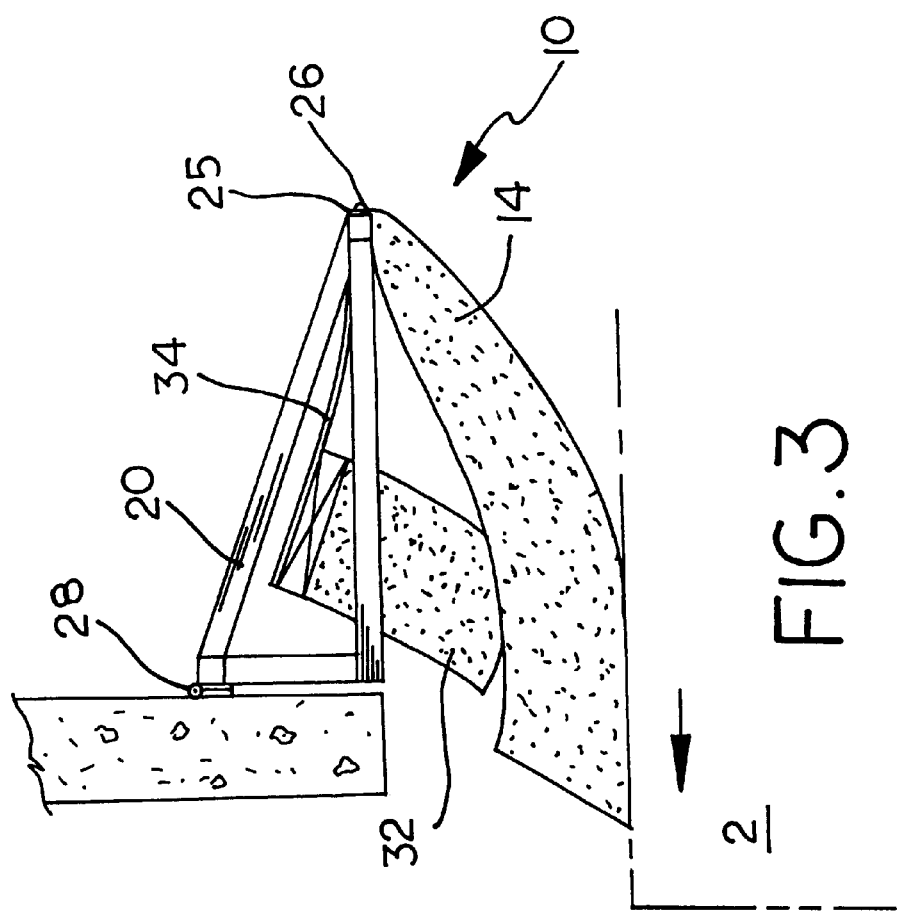

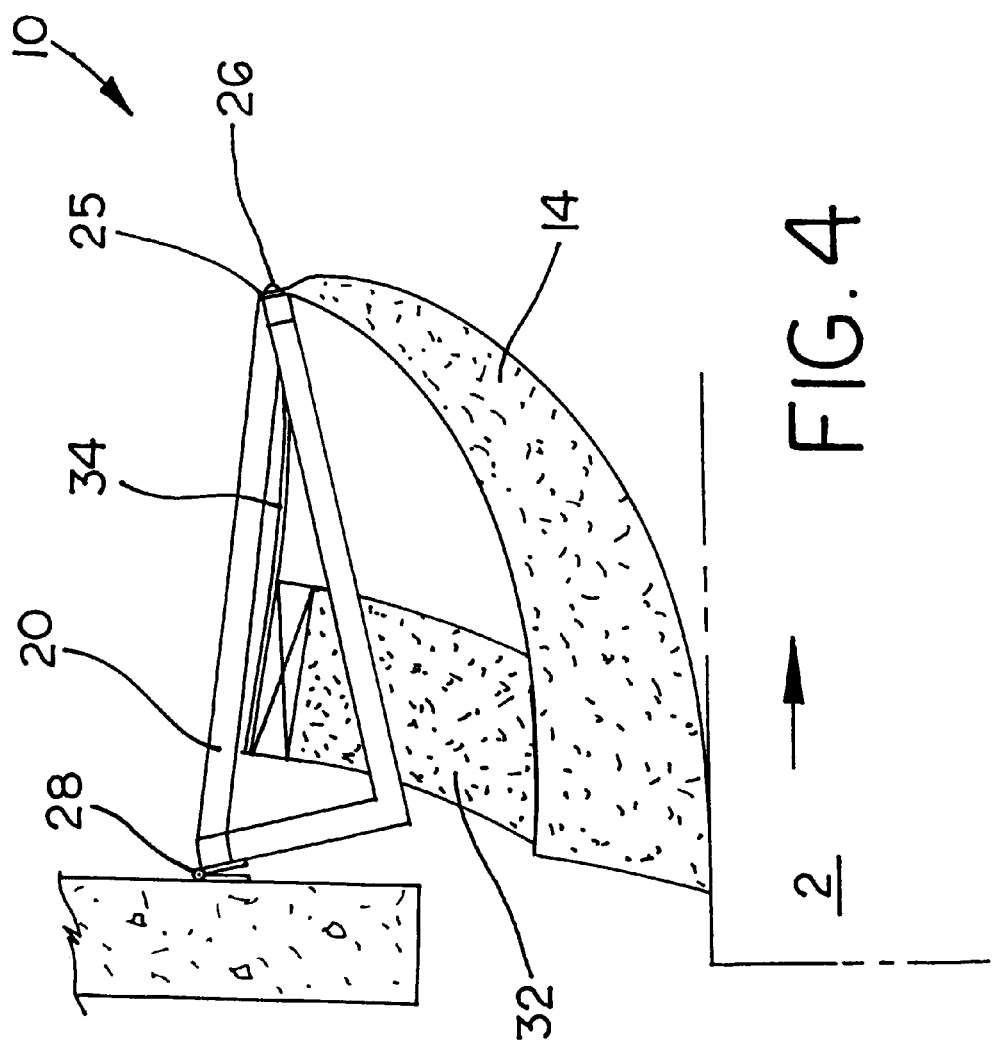

US 6,205,721 B1

SEALING APPARATUS FOR FORMING A WEATHER SEAL BETWEEN A VEHICLE AND A LOADING DOCK OR THE LIKE

FIELD OF THE INVENTION

The present invention relates generally to loading docks and, more particularly, to sealing apparatus for creating a weather seal between a vehicle and a loading dock or the like.

BACKGROUND OF THE INVENTION

The need to shelter loading docks and the personnel working thereon from weather related elements has long been known. For example, it has long been known that it is undesirable to permit snow, rain or wind to enter either a warehouse or a truck being unloaded at a dock. Permitting heated or cooled air to escape the warehouse during use of the dock is equally undesirable.

Many proposals have addressed these issues. For example, dock shelters and dock seals which provide employee comfort and protect inventory by keeping weather elements away from the dock area and which improve energy conservation by limiting loss of heated or cooled air have long been commercially available. While many of the above-noted products have been very successful in addressing these environmental issues, there remains room for improvement. For example, when a vehicle such as a semi-trailer truck has been in a rain or snow storm, it often collects water (and sometimes slush, snow or ice) on the top surface of its trailer. When the trailer backs up to a loading dock, there is a potential for this collection of water (or slush, snow or ice) to flow over the leading edge of the top of the trailer into the loading dock area. A similar effect can occur with a truck parked at a dock when a rain or snow storm begins. Although many available shelters and seals will prevent rain and snow from falling directly into the dock area, there is a potential for water, snow, ice or slush to collect on the trailer top and subsequently run over the leading edge of the trailer onto the dock. This potential is particularly acute in loading docks with parking areas pitched towards the dock, as all or nearly all of the rain or melting snow on the top surface of the trailer will run towards the lowest part of the trailer, which, in this example, is the leading edge of the truck adjacent the dock.

SUMMARY OF THE INVENTION

In accordance with an aspect of the invention, an apparatus for use with a structure located adjacent a parking area for vehicles having a top surface is provided. The apparatus is provided with a support mounted for vertical movement away from the top surface when the vehicle moves away from the structure. It is also provided with a compressible seal secured to the support. The seal is deflectable from a first position in the path of a vehicle entering the parking area to a second position wherein the seal compresses against the top surface of the vehicle parked in the parking area.

In some embodiments, the vertical movement of the support is a result of a pivoting motion thereof. In other embodiments, the vertical movement of the support is a result of a flexing motion thereof.

In some embodiments, the support is adapted to remain substantially stationary when the vehicle moves toward the structure. Preferably, the vertical movement of the support relieves pressure between the seal and the top surface to facilitate exiting of the vehicle. Optionally, the seal may remain in contact with the vehicle when the support moves away from the top surface.

In some embodiments, the support comprises a hood secured above a dock opening, and the top of the hood is pivotably secured to the structure.

In some embodiments, the support comprises a first arm having a first end pivotably coupled to the structure and a second end secured to the seal. In such embodiments, the first arm may optionally be sized to rotate about the first end without contacting the hood.

In some embodiments, the support comprises a first arm; and a second arm pivotably coupled to the first arm, wherein the seal is coupled to the second arm.

In any of the foregoing embodiments, the seal may comprise a foam pad and/or the apparatus may be provided with a sand tube secured to a lower edge of the seal.

In any of the foregoing embodiments, the apparatus may be provided with a stiffening member disposed between the seal and the structure. In some such embodiments, the stiffening member comprises a foam block mounted on spring steel.

In accordance with another aspect of the invention, an apparatus is provided for use with a structure located adjacent a parking area for vehicles having a top surface. The apparatus includes a support and a seal secured to the support. The seal is deflectable from a first position wherein a vehicle approaching the structure first contacts the seal, to a second position wherein the seal contacts the top surface of the vehicle parked in the parking area. The apparatus is further provided with a stiffening member located proximal to the seal. The seal contacts the stiffening member as it deflects from the first position. The stiffening member is distally biased to bias the seal towards the first position.

In accordance with still another aspect of the invention, an apparatus is provided for use with a structure located adjacent a parking area for vehicles having a top surface. The apparatus includes a support mounted for vertical movement relative to the structure. It also includes a compressible seal secured to the support. The seal is deflectable from a first position in the path of a vehicle entering the parking area to a second position wherein the seal compresses against the top surface of the vehicle parked in the parking area. The apparatus further includes a foam block located proximal to the seal. The seal contacts the foam block as the seal deflects from the first position. The foam block is distally biased to bias the seal towards the first position.

In accordance with yet another aspect of the invention, an apparatus is provided for use with a structure located adjacent a parking area for vehicles having a top surface with a leading edge. The apparatus includes a deflectable seal mounted in a path of a vehicle entering the parking area. It also includes a locator secured to the deflectable seal and including a distal recess for engaging the leading edge of a vehicle entering the parking area.

In some embodiments, if the leading edge of the vehicle is higher than an initial position of the locator, the deflectable seal deflects such that the locator moves upwards to locate the leading edge as the vehicle enters the parking space.

In any of the foregoing embodiments, the deflectable seal may optionally be rigid or may optionally comprise a foam pad.

In any of the foregoing embodiments, the locator may optionally comprise a foam block and/or the locator may be pivotably attached to the deflectable seal.

In accordance with yet another aspect of the invention, an apparatus is provided for use with a structure located adjacent a parking area for vehicles having a top surface. The apparatus includes a support and a seal secured to the support. The seal is deflectable from a first position wherein a vehicle approaching the structure first contacts the seal, to a second position wherein the seal contacts the top surface of the vehicle parked in the parking area. The apparatus also includes two phase pressure means for applying a first pressure to the seal until the seal has been deflected beyond a first predetermined distance, and to thereafter apply a second pressure greater than the first pressure to the seal.

In the preferred embodiment, the two phase pressure means comprises a foam block mounted upon spring steel. Preferably, the spring steel applies a substantial portion of the first pressure, and the second pressure is developed by a resistance to deformation of the foam block and a force applied by the spring steel.

In accordance with another aspect of the invention, an apparatus is provided for use with a structure located adjacent a parking area for vehicles having a top surface. The apparatus includes a support mounted for vertical movement relative to the structure and a compressible seal secured to the support. The seal is deflectable from a first position in the path of a vehicle entering the parking area to a second position wherein the seal compresses against the top surface of the vehicle parked in the parking area. The apparatus further includes two phase pressure means for applying a first pressure to the seal until the seal has been deflected beyond a first predetermined distance, and to thereafter apply a second pressure greater than the first pressure to the seal.

Other features and advantages are inherent in the apparatus claimed and disclosed or will become apparent to those skilled in the art from the following detailed description and its accompanying drawings.

BRIEF DESCRIPTION OF THE DRAWINGS

FIG. 2 is a schematic illustration showing a cross-section of the sealing apparatus of FIG. 1 in a first position.

FIG. 3 is a view similar to FIG. 2, but showing a truck parked at the loading dock.

FIG. 4 is a view similar to FIG. 3, but showing the apparatus reacting to the departure of the truck.

DESCRIPTION OF THE PREFERRED EMBODIMENTS

Figure 1:
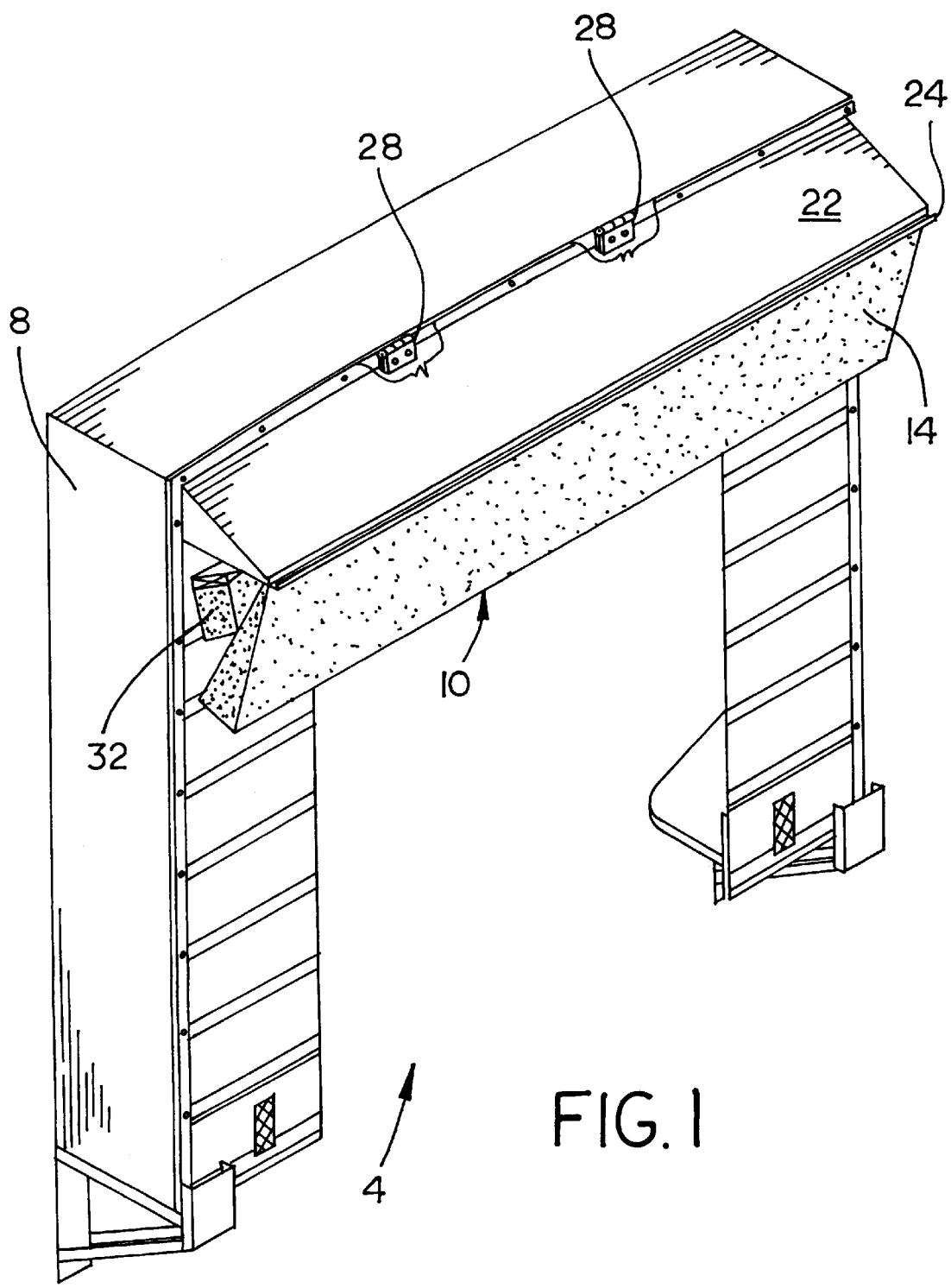
FIG. 1 is a perspective view of a dock shelter fitted with a sealing apparatus constructed in accordance with the teachings of the instant invention.

A sealing apparatus 10 constructed in accordance with the teachings of the invention is shown generally in FIG. 1. Although the sealing apparatus 10 is particularly well suited for use with a loading dock 4 on a warehouse or the like, persons of ordinary skill in the art will readily appreciate that the teachings of the instant invention are not limited to any particular environment of use. On the contrary, the teachings of the invention can be employed with virtually any structure adjacent a parking area where the creation of a seal with a top surface of a vehicle is desired. Thus, although the sealing apparatus 10 illustrated in FIG. 1 is shown mounted on a dock shelter 8 such as the WG-402 sold by the Frommelt Division of Rite-Hite Corporation, persons of ordinary skill in the art will readily appreciate that the apparatus 10 could likewise be mounted to a dock seal such as the Eliminator™ sold by the Frommelt Division of Rite-Hite Corporation; directly to a warehouse wall; or to any other structure adjacent a parking area without departing from the scope or spirit of the invention.

For the purpose of forming a substantially weatherproof seal with the top of a vehicle, the sealing apparatus 10 is provided with a compressible seal 14. As will be apparent to those of ordinary skill in the art, the seal 14 can be constructed of any compressible material. However, in the preferred embodiment, the seal 14 is constructed of a foam pad such as low density open cell polyurethane foam encased in a wear-resistant covering such as vinyl or hypalon coated flexible cloth. As shown in FIGS. 2 and 3, the seal 14 is preferably positioned in the path of a vehicle entering the parking area for deflection from a first position (such as that shown in FIG. 2) to a second position (such as that shown in FIG. 3) wherein the seal engages or contacts the top surface of a vehicle located in the parking area illustratively by compressing against the top surface. It will be understood that the illustrated first and second positions are representative, and that other locations and/or positions for the seal 14 can be used as the first and second positions without departing from the scope of the invention. By way of example, not limitation, a vehicle having a height different from that shown in FIG. 3 will cause the seal 14 to deflect to a correspondingly different second position, as will a vehicle moved further (or closer) from the dock shelter 8.

In order to ensure an effective seal is created, the seal 14 preferably has a length as long as the opening of the loading dock 4. Although the seal illustrated in FIGS. 1–4 has a triangular cross-section, persons of ordinary skill in the art will readily appreciate that seals having other sizes and shapes could likewise be employed without departing from the scope of the invention.

To suspend the seal 14 in the path of a vehicle entering the parking area, the sealing apparatus 10 is provided with a support 20. In the preferred embodiment illustrated in FIGS. 1–4, the support 20 is implemented as the support frame of a hood 22. A fabric such as vinyl or hypalon coated flexible cloth or metal sheeting such as coated steel can be secured to the support frame by bolts or other conventional fasteners to create a further barrier preventing weather from entering the dock area. As shown in FIG. 1, the hood 22 is preferably provided with a gutter 24 along its distal end to collect rain water and the like running down the sloped surface of the hood 22 and to direct that water away from the dock opening.

To fasten the seal 14 to the support 20, the wear resistant covering of the seal 14 preferably includes an extending strip 25 of fabric. As shown in FIGS. 2–4, the fabric strip 25 preferably extends the length of the seal 14 and is secured via bolts 26 or any other conventional fastener along the distal end of the support 20.

In accordance with the teachings of an important aspect of the invention, the support 20 is mounted to the dock shelter 8 for vertical movement away from the top surface of the vehicle 2 when the vehicle 2 moves away from the loading dock. Preferably, this vertical movement is achieved by pivotably mounting the support but may also be achieved via a flexible connection as discussed below in connection with FIG. 15. As shown in FIG. 1, the pivotable connection is preferably effected by a series of hinges 28 located along the top, proximal portion of hood 22. As shown in FIG. 3, when a vehicle enters the parking area and deflects the seal 14 distally, the rearward force applied by the vehicle has a tendency to pull the support 20 in a downward direction. However, as also shown in FIG. 3, the support 20 is preferably mounted to abut a surface of the dock shelter 8 thereby limiting downward movement of the support 20. Accordingly, the support 20 is preferably adapted to remain substantially stationary when a vehicle backs into the parking area.

However, when the vehicle 2 begins to move out of the parking area, friction between the seal 14 and the top of the vehicle 2 applies a force to the seal 14 in the distal direction. To relieve the pressure developed between the seal 14 and the vehicle 2, the support 20 pivots via hinge 28 (see FIG. 4) thereby facilitating exiting by the vehicle 2.

In order to prevent collected water from falling into the parking area near the loading dock as a vehicle exits, even though the support 20 pivots away from the vehicle 2, the compressible seal 14 preferably stays in contact with the top of vehicle 2 substantially until it returns to the first position. When the seal 14 loses contact with the vehicle 2, the support 20 returns to its lowermost position (see FIGS. 1–3) under the force of gravity.

In accordance with an aspect of the invention, the sealing apparatus 10 is provided with two phase pressure means for applying a first pressure to the seal 14 until the seal has been deflected beyond a first predetermined distance, and to thereafter apply a second pressure grater than the first pressure to the seal 14. In the preferred embodiment, the two phase pressure means is implemented by a stiffening member in the form of a compressible foam block 32 mounted on support 20 via spring steel 34. Preferably, the foam block 32 has substantially the same length as the compressible seal 14 to ensure a substantially uniform compression force is applied along substantially the entire length of the seal 14. However, persons of ordinary skill in the art will readily appreciate that a foam block of another length might likewise be appropriate in this role. By way of example, not limitation, two or more separately mounted foam blocks could be mounted along the length of the seal 14 without departing from the scope or the spirit of the invention.

In any event, the spring steel 34 and the foam block 32 are preferably selected such that initially the spring steel 34 requires less applied force to deflect than the block 32 requires to deform. Thus, when the vehicle 2 starts to deflect the seal 14 from the first position towards the second position, the seal 14 contacts the block 32 thereby deflecting the spring steel 34 distally. The spring steel 34, thus, applies a resistive force to seal 14 that has the effect of compressing seal 14 against the vehicle 2. During this initial deflection of the spring steel 34, the foam block 32 will preferably experience only incidental deformation, and most of the resistive force applied by the two phase pressure means is developed by the spring steel 34.

Since the resistive force of the spring steel 34 increases linearly with displacement, after the spring steel 34 has traveled distally a sufficient distance, the foam block 32 begins to experience a more substantial deformation. The force developed by the deformation of block 32 is additive to the resistive force applied by the spring steel 34. Therefore, after the seal 14 has deflected the spring steel 34 a sufficient distance, the two phase pressure means applies an increased pressure to the seal; the increased pressure being a combination of the forces generated by the deflected spring steel 34 and the deformed foam block 32.

As best shown in FIGS. 2 and 3, the foam block 32 is preferably mounted to the spring steel 34 via a wood block such as a conventional 2"×4" board. As also shown in FIGS. 2 and 3, the distal end of spring steel 34 is preferably mounted to the distal end of the support 20 such that the block 32 is positioned between the seal 14 and the structure on which the sealing apparatus 10 is mounted. As a result, the two phase pressure means pivots with the support 20 when a vehicle leaves the parking area (see FIG. 4).

Persons of ordinary skill in the art will readily appreciate that the distal, variable force applied by the two phase pressure means returns the compressible seal 14 to the first position after the vehicle 2 leaves the parking area.

Although, as persons of ordinary skill in the art will readily appreciate, other materials could likewise be employed in this role, in the preferred embodiment, foam block 32 is implement by high density open cell polyurethane foam encased in a wear-resistant covering made of vinyl or hypalon coated flexible cloth. Preferably, the foam block 32 has a higher density than the foam pad 14. Similarly, although other resilient material could be used in this role, in the preferred embodiment, spring steel 34 is implemented by tempered C1074 steel.

Figure 5:
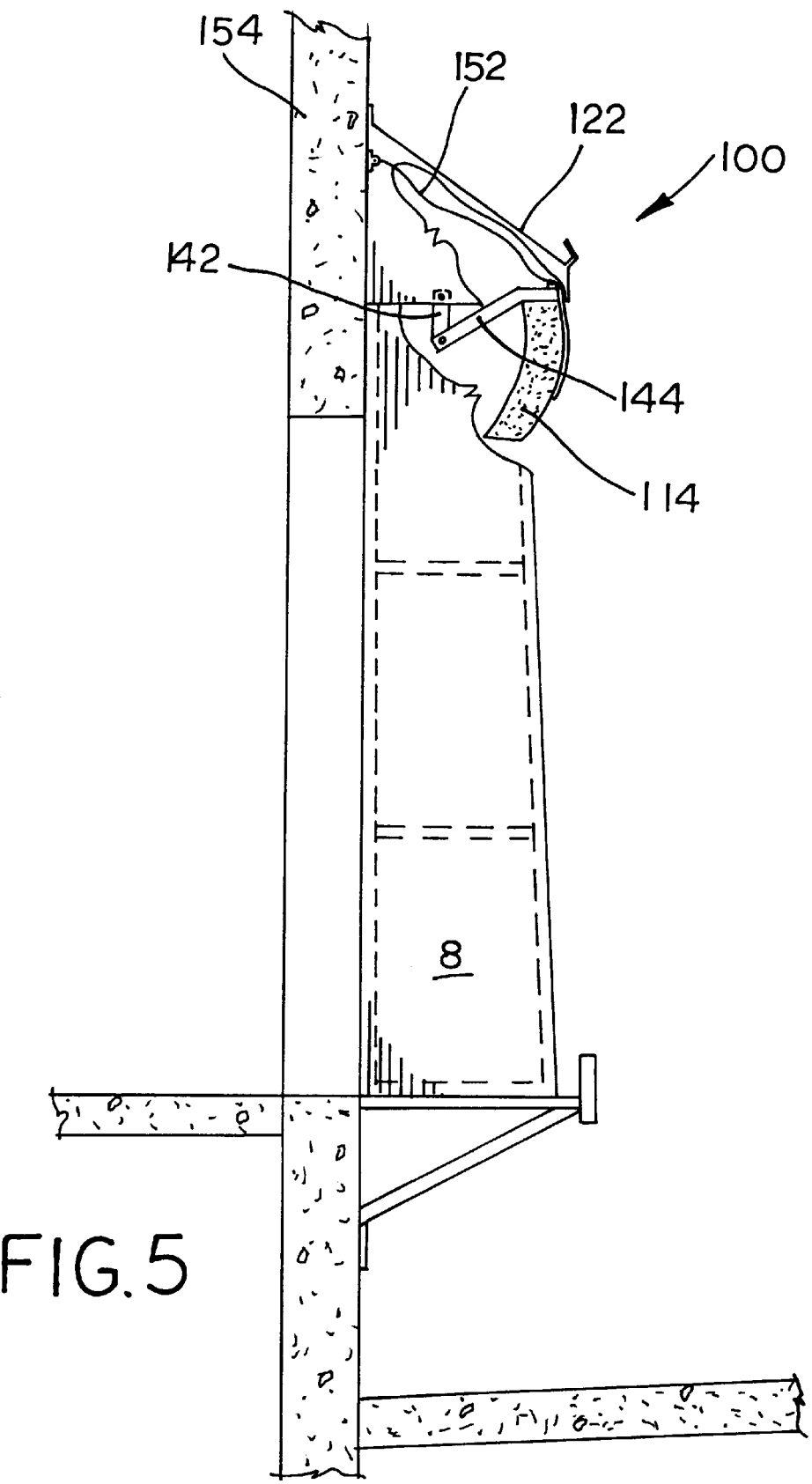
FIG. 5 is a schematic illustration of a cross-section of another sealing apparatus constructed in accordance with the teachings of the invention.
Figure 6:
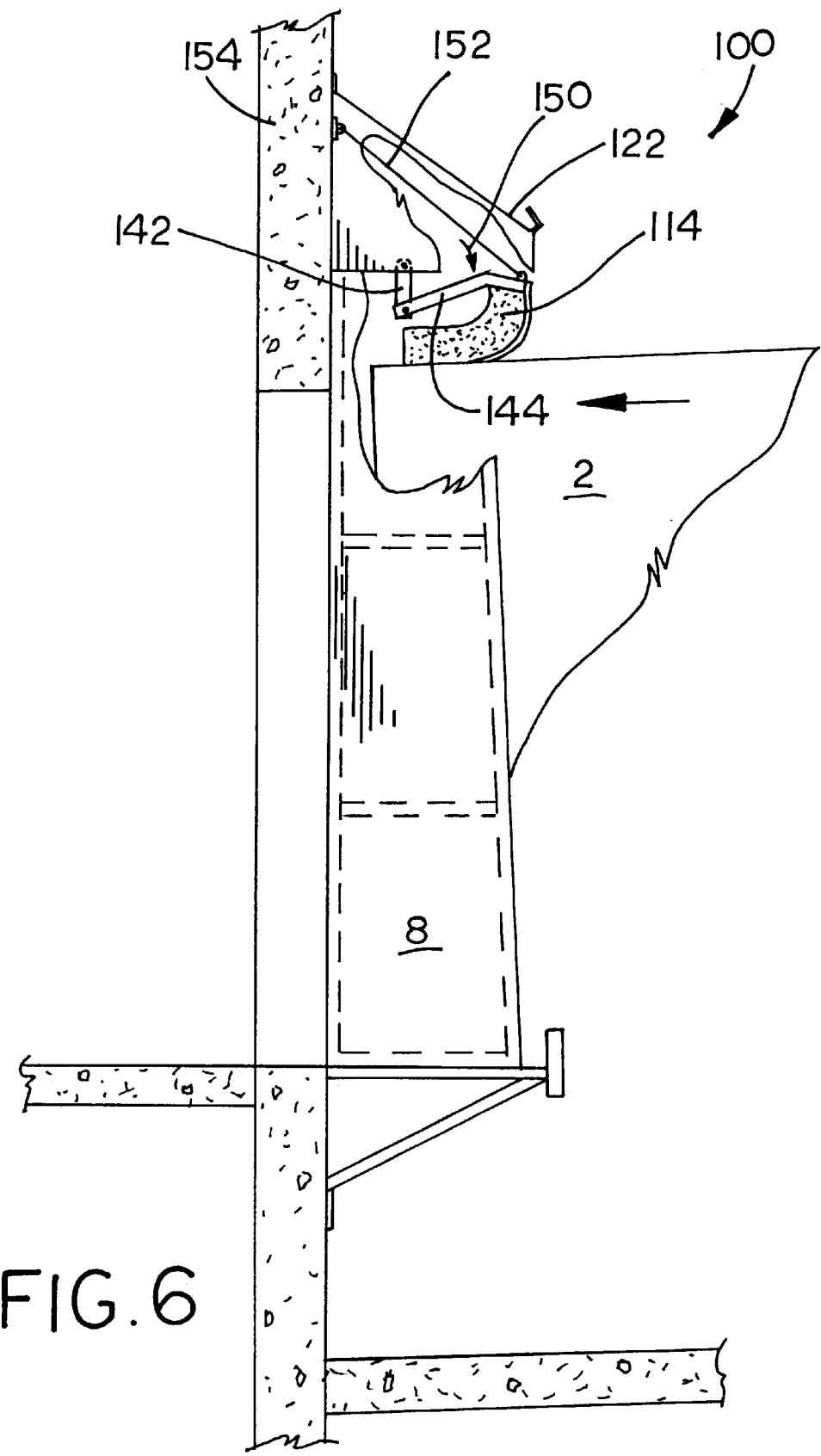
FIG. 6 is a view similar to FIG. 5, but showing a truck parked at the loading dock.
Figure 7:
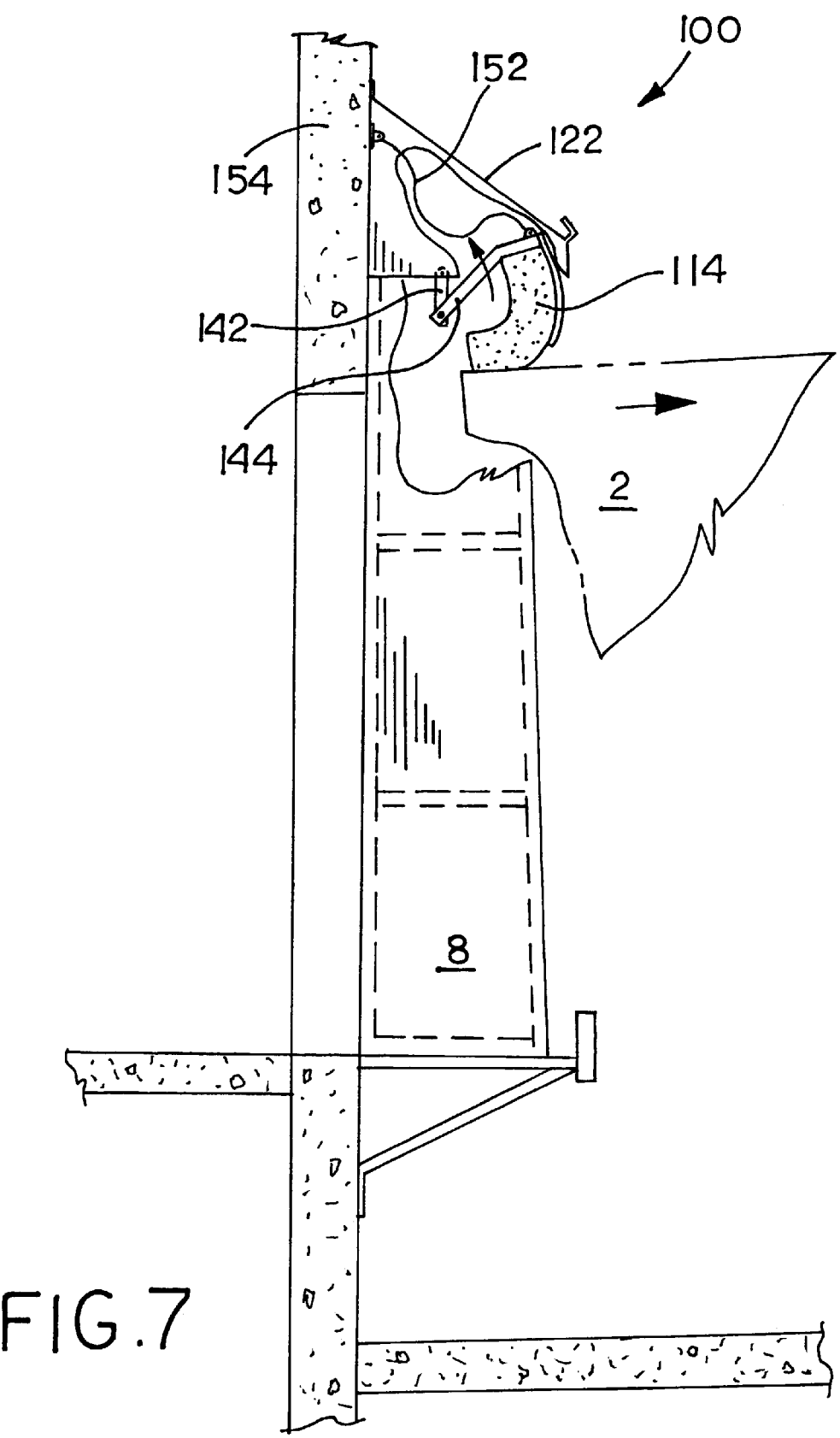
FIG. 7 is a view similar to FIG. 6, but showing the apparatus reacting to the departure of the truck.

An alternative sealing apparatus 100 constructed in accordance with the teachings of the invention is illustrated in FIGS. 5–7. As with the sealing apparatus 10, the sealing apparatus 100 can be mounted on a dock shelter 8, a dock seal, a wall, or on any other structure where a seal is desired without departing from the scope of the invention.

As shown in FIG. 5, the sealing apparatus 100, like the sealing apparatus 10 discussed above, is provided with a compressible seal 114 and a support 120. Like the compressible seal 14 of the sealing apparatus 10 discussed in connection with FIGS. 1–4, the compressible seal 114 preferably comprises compressible foam such as low density open cell polyurethane foam encased in a wear-resistant covering such as vinyl or hypalon coated flexible cloth. However, unlike the support 20 of the sealing apparatus 10, support 120 of sealing apparatus 100 does not comprise the frame of a hood. Instead, it comprises two pivotable arms 142, 144. As shown in FIG. 5, the first pivotable arm 142 is pivotably coupled at a first end to the hood of a dock shelter or the like. A second end of the first pivotable arm 142 is pivotably coupled to a first end of angular arm 144. The second end of angular arm 144 suspends the compressible seal 114 in the first position in the path of vehicle 2 entering the parking area.

As shown in FIG. 6, when a vehicle 2 enters the parking area, it deflects the compressible seal 114 from the first position towards a second position wherein the seal 114 is compressed against the top of the vehicle 2. As with the sealing apparatus 10 discussed above, the deflection of the compressible seal 114 from the first position towards the second position tends to force the pivotable arms 142, 144 downward as indicated by the arrow 150 in FIG. 6. Downward movement of the arms 142, 144 is limited, however, by a cable 152 coupled at one end to the wall 154 of the structure supporting apparatus 100 with a bolt or other conventional fastener and, at the other end, to the distal end of arm 144, also via a bolt or other conventional fastener (see FIG. 6). Alternatively, downward movement of the arms 142, 144 can be limited by a bracket such as a transverse bar mounted across the dock opening proximally to the seal 114 and below arm 144.

As shown in FIG. 7, when the vehicle 2 leaves the parking area, the pivotable connections associated with arms 142, 144 permit those arms to pivot upwards (as indicated by arrow 156) to relieve pressure between seal 114 and the top of the vehicle 2.

As also shown in FIG. 7, the dimensions of arms 142, 144 are preferably selected to permit pivoting within a hood 122 (shown with an optional gutter 124) mounted above the loading dock area.

Figure 8:
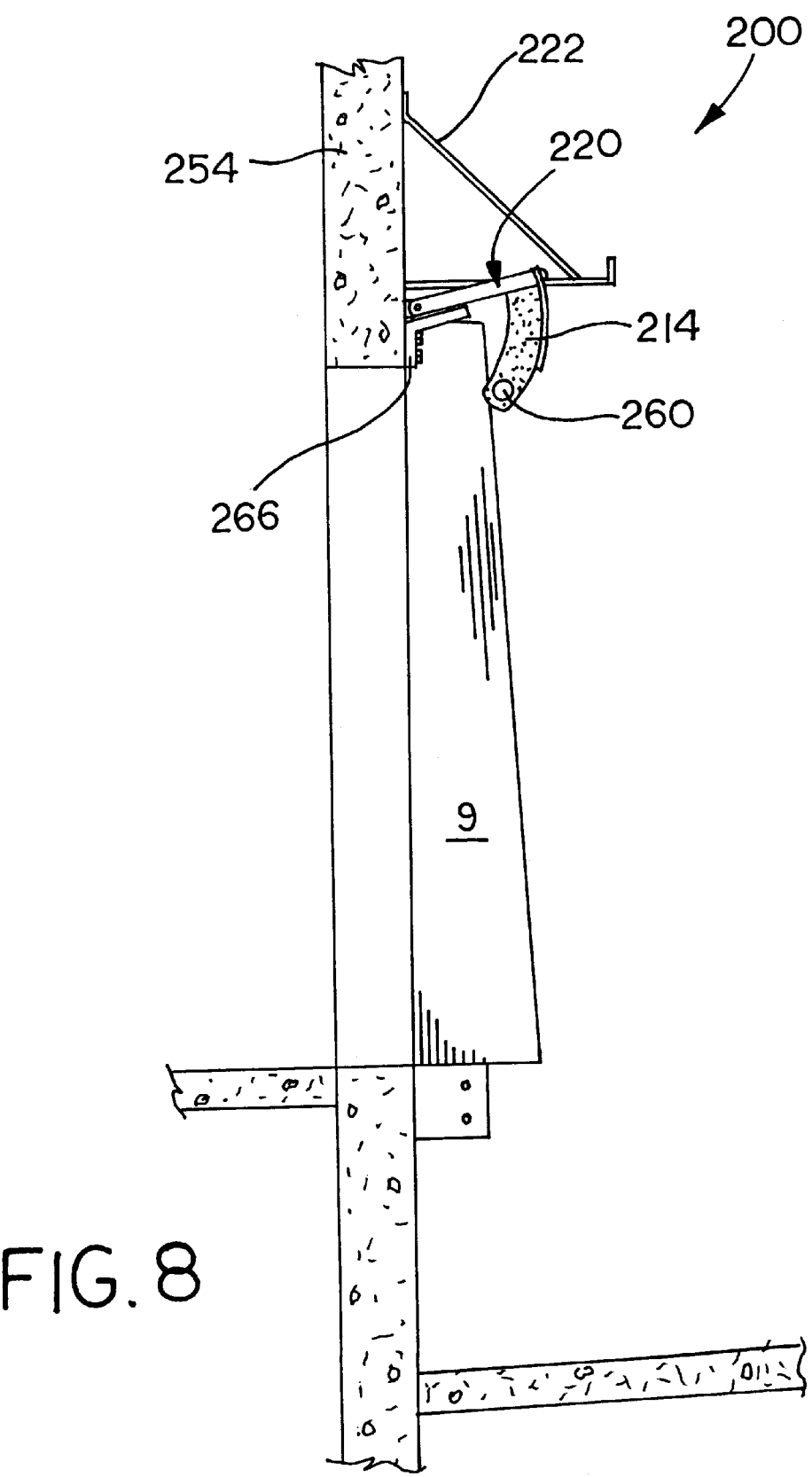
FIG. 8 is a schematic illustration of a cross-section of yet another sealing apparatus constructed in accordance with the teachings of the invention.
Figure 9:
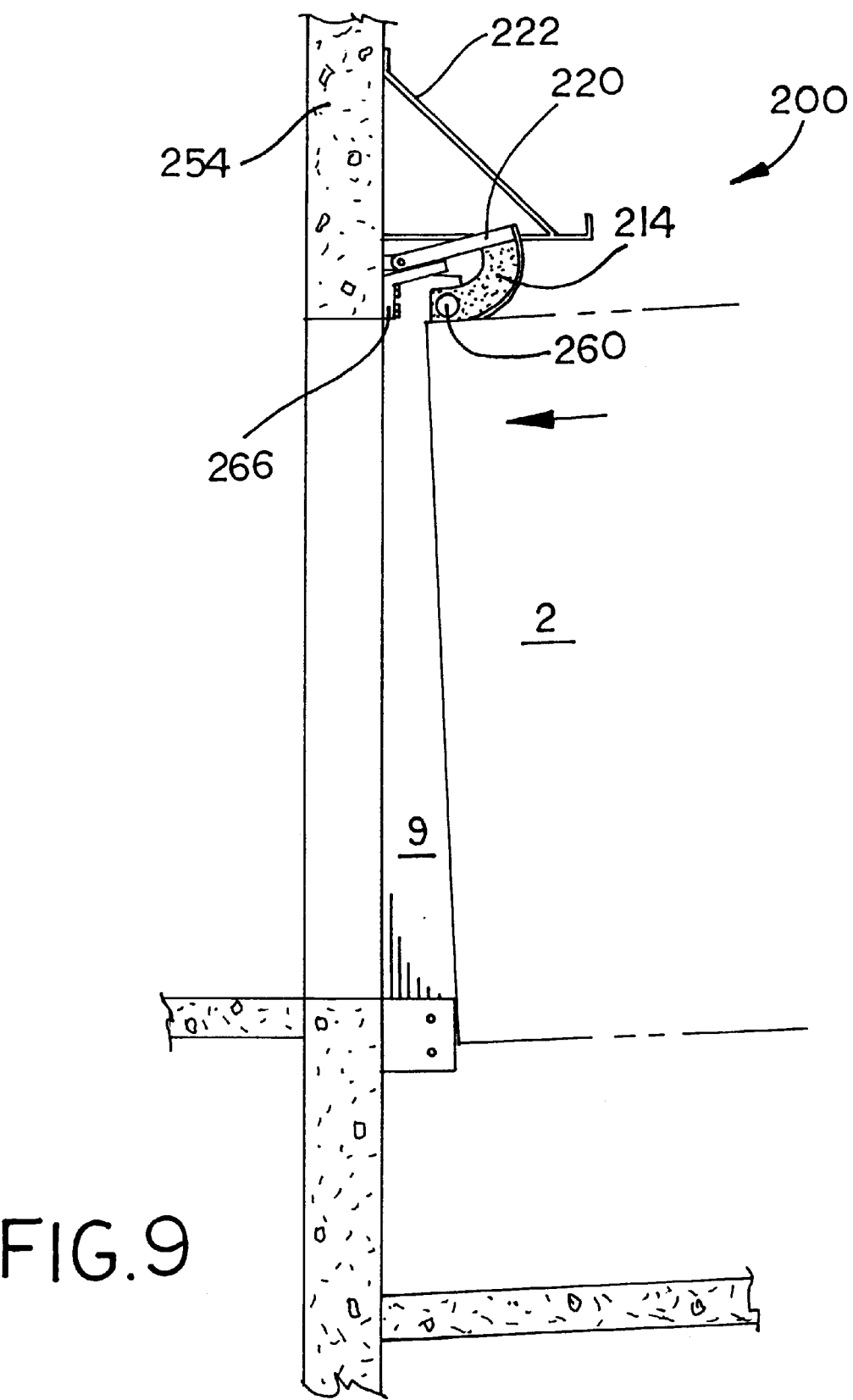
FIG. 9 is a view similar to FIG. 8, but showing a truck parked at the loading dock.
Figure 10:
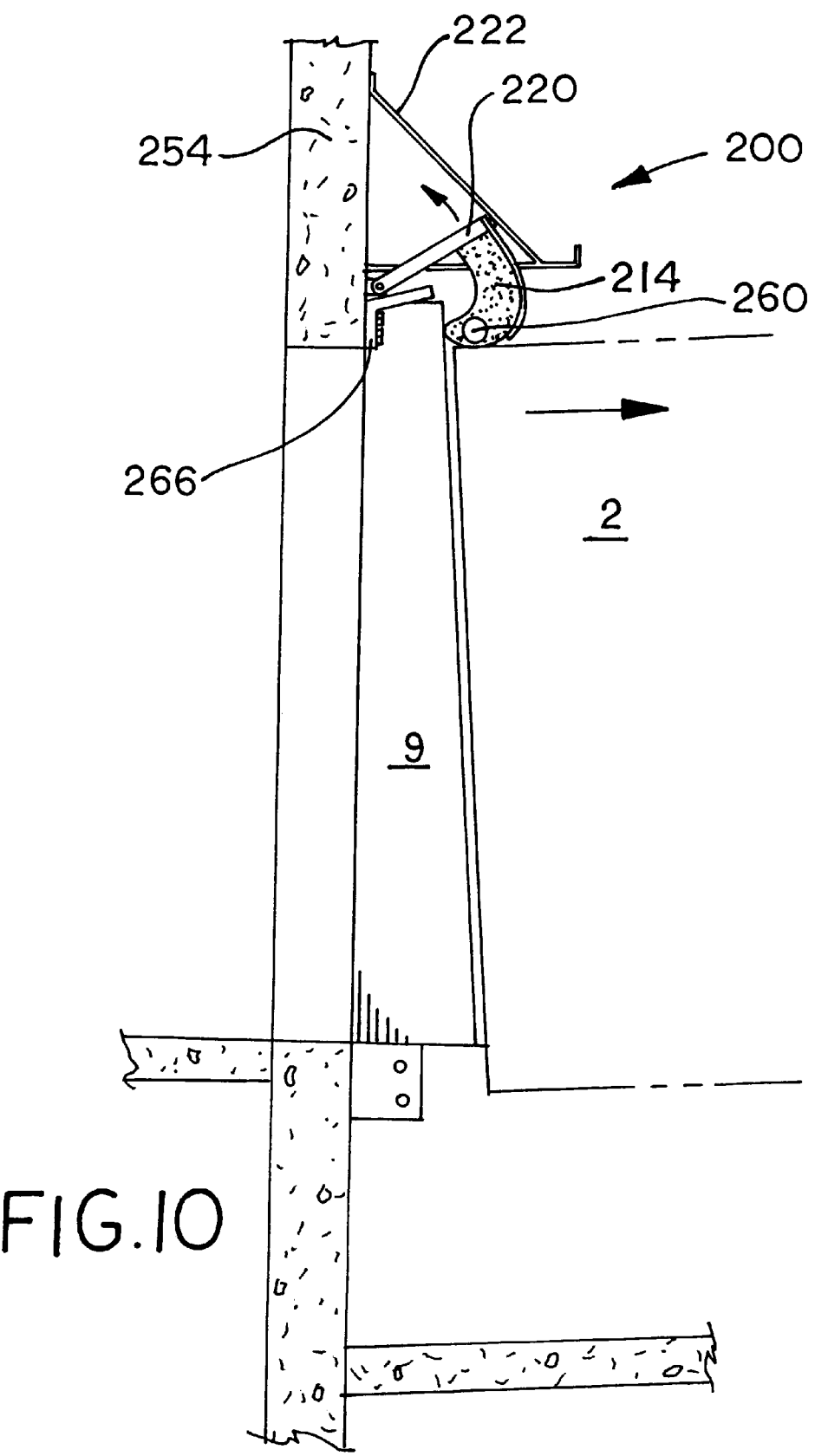
FIG. 10 is a view similar to FIG. 9, but showing the apparatus reacting to the departure of the truck.

Another alternative sealing apparatus 200 constructed in accordance with the teachings of the invention is shown in FIGS. 8–10. Although, like the sealing apparatus 10, 100 discussed above, the sealing apparatus 200 can be mounted on dock shelters, on dock seals, on walls, or on any other structure where a seal with the top of a vehicle 2 is desired, the sealing apparatus 200 is illustrated in FIGS. 8–10 in combination with a dock seal 9. The illustrated dock seal 9 comprises foam pads covered in a protective covering which compress when abutted by a vehicle (compare FIGS. 8 and 9).

As with the sealing apparatus 10, 100 discussed above, the sealing apparatus 200 includes a compressible seal 214 and a support 220. In this embodiment of the inventive teachings, however, the seal 214 is provided with a sand-filled tube 260 at its bottom end. Sand tube 260 provides the seal 214 with additional inertia to ensure a good seal with the top of the vehicle 2 and to assist with returning the compressible seal 214 to the first position shown in FIG. 8 after a vehicle 2 leaves the parking area. The sand tube is preferably mounted within the wear resistant covering containing the foam seal as shown in FIG. 8.

Also, unlike the previously discussed apparatus 10, 100, the support 220 of the sealing apparatus 200 comprises a unitary arm. The proximal end of the unitary arm is pivotably mounted to the wall 254 above the loading dock as shown in FIGS. 8–10. The distal end of the unitary arm supports the compressible seal 214 within the path of vehicles entering the parking area. A bracket 266 mounted to wall 254 with bolts or some other conventional fasteners defines the lowermost position of pivotable support 220.

As with the previously discussed embodiments, a vehicle entering the loading dock area will deflect the compressible seal 214 from a first position to a second position wherein the seal 214 compresses against the top of the vehicle 2 (see FIG. 9). When the vehicle 2 leaves the parking area, the support 220 pivots upwards (see FIG. 10) thereby relieving pressure between the seal 214 and the top of the vehicle 2.

If the sealing apparatus 200 is employed with a hood 222 (as is currently preferred), the support 220 is preferably sized to rotate about its pivot point without contacting the hood 222.

Figure 11:
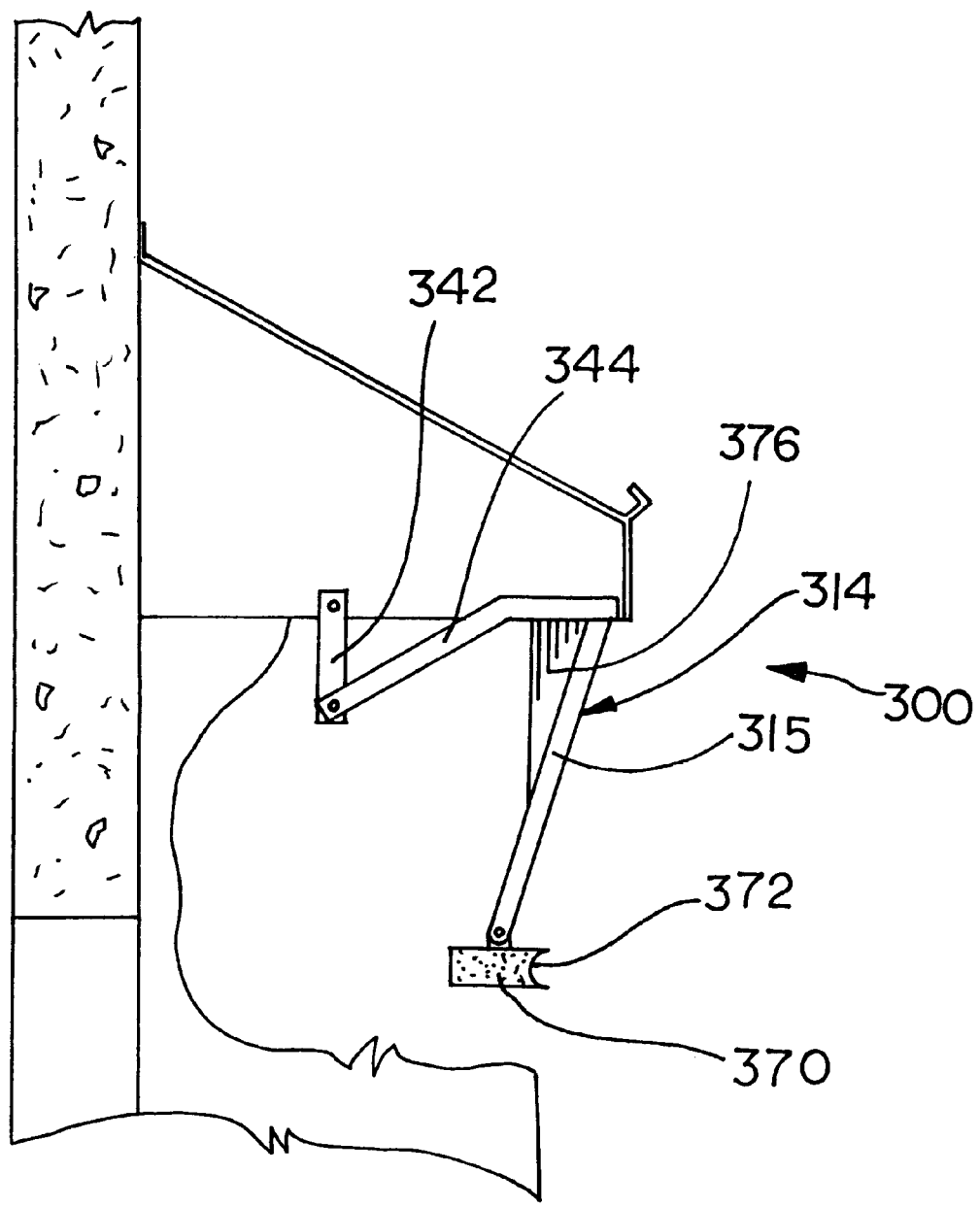
FIG. 11 is a schematic illustration of a cross-section of still another sealing apparatus constructed in accordance with the teachings of the invention.
Figure 12:
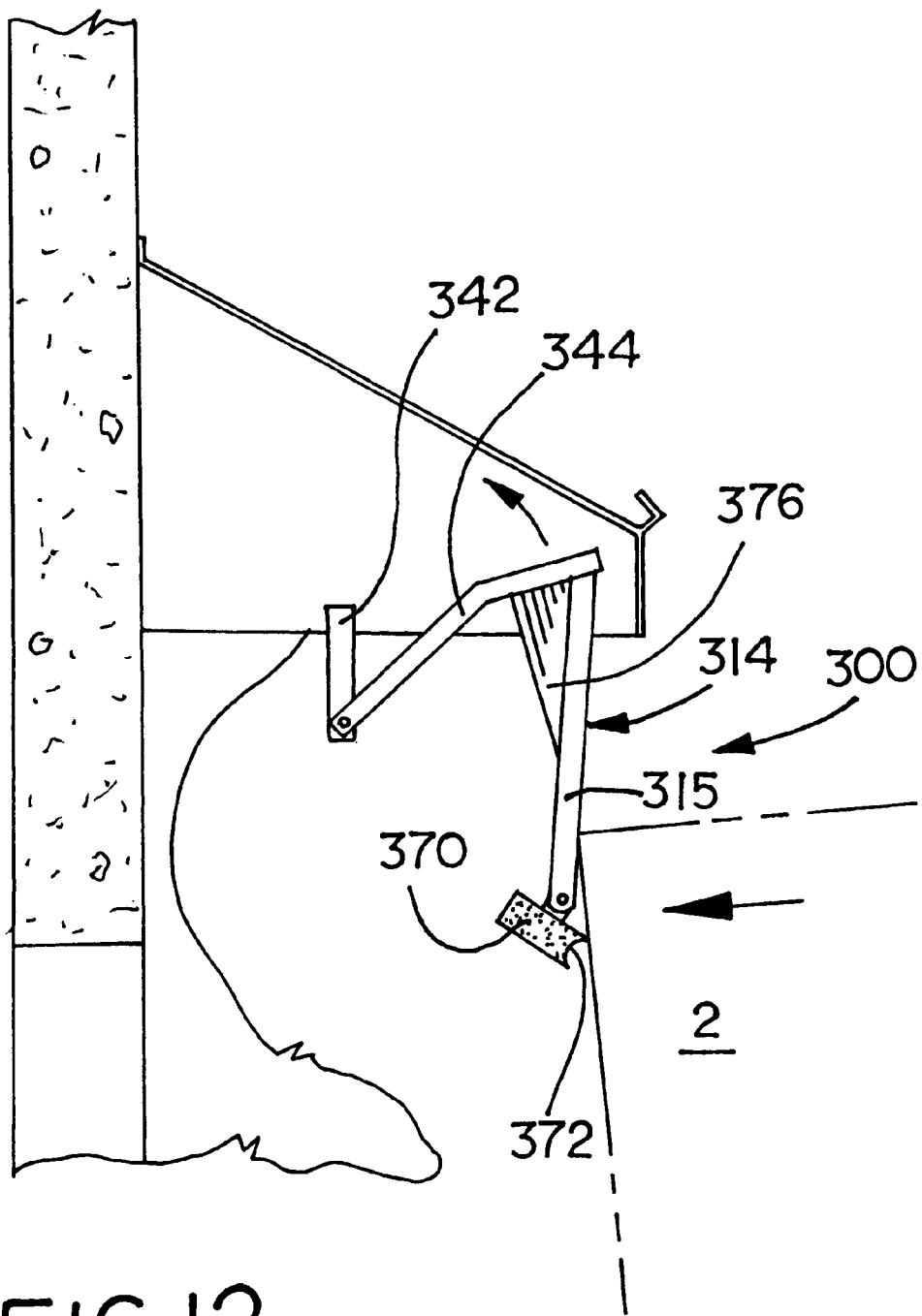
FIG. 12 is a view similar to FIG. 11, but showing a truck backing into the loading dock.
Figure 13:
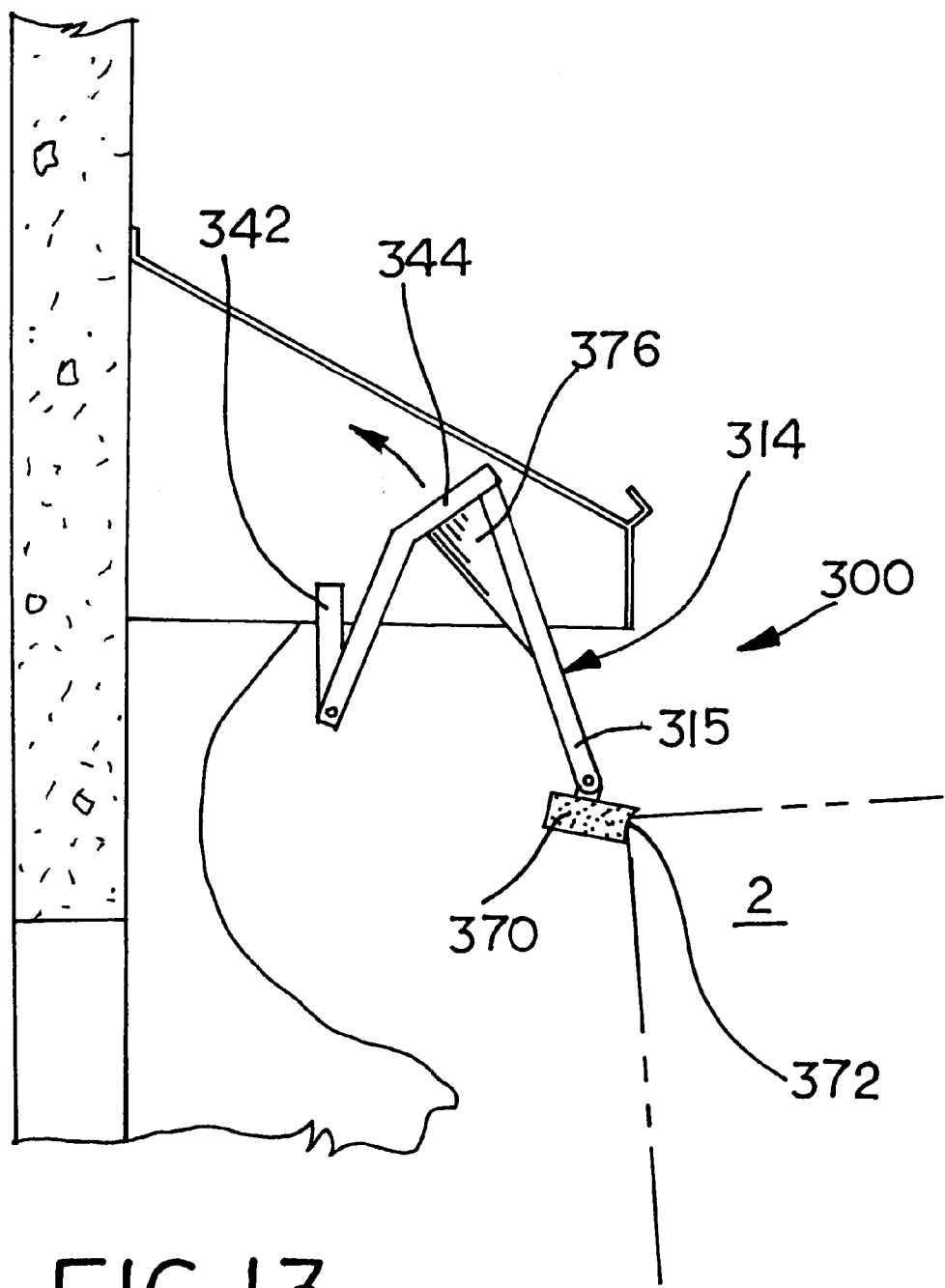
FIG. 13 is a view similar to FIG. 12, but showing the truck parked at the loading dock.

Still another alternative sealing apparatus 300 constructed in accordance with the teachings of the invention is illustrated in FIGS. 11–13. As shown in FIG. 11, the sealing apparatus 300 is provided with a deflectable seal 314 mounted in the path of a vehicle 2 entering the parking area. In the embodiment illustrated in FIGS. 11–13, the deflectable seal 314 comprises a rigid plate 315 mounted on a pair of support arms 342, 344 constructed like the support arms 142, 144 discussed above in connection with FIGS. 5–7. However, persons of ordinary skill in the art will appreciate that the rigid plate 315 could be replaced with a compressible foam pad such as those discussed above and/or the support arms 342, 344 can be implemented in many different manners including, but not limited to, the support structures discussed in connection with FIGS. 1–3 and 8–10, without departing from the scope of the invention.

In the embodiment shown in FIGS. 11–13, an elongated locator 370 is pivotably coupled to the bottom edge of the deflectable seal 314. The locator 370 preferably extends at least as long as the width of the widest vehicle 2 to be serviced by the apparatus 300.

In any event, the locator 370 preferably comprises a foam block such as high density open cell polyurethane foam encased in a wear-resistant covering such as vinyl or hypalon coated flexible cloth. As shown in FIG. 11, the locator defines a recess 372 at its distal edge. The recess 372 is sized to engage the leading edge of a vehicle 2 entering the parking area.

Significantly, if the leading edge of a vehicle 2 entering the parking area is higher than an initial position of the locator (see FIG. 12), the leading edge of the vehicle 2 will deflect the deflectable seal 314 such that the locator 370 moves upwards to locate the leading edge of the vehicle 2 (see FIG. 13). When the leading edge of the vehicle 2 enters the recess 372, locator 370 forms a seal with the truck 2 which substantially prevents water, snow, ice and the like from rolling over the leading edge of the vehicle 2 into the loading dock area.

As will be appreciated by persons of ordinary skill in the art, sealing apparatus 300 will not function if the vehicle 2 is shorter than the initial position of locator 370. Thus, the deflectable seal should be dimensioned such that locator 370 has an initial position (see FIG. 11) which is at least as low as the shortest vehicle 2 to be serviced.

In order to strengthen the rigid plate 315 against damage from impacts with vehicles 2, one or more corner plate 376 is mounted between plate 315 and support arm 344.

Although not shown in FIGS. 11–13, a cable such as cable 152 in FIGS. 5–7 can be utilized to limit the downward movements of the arms 344, 346.

Figure 14:
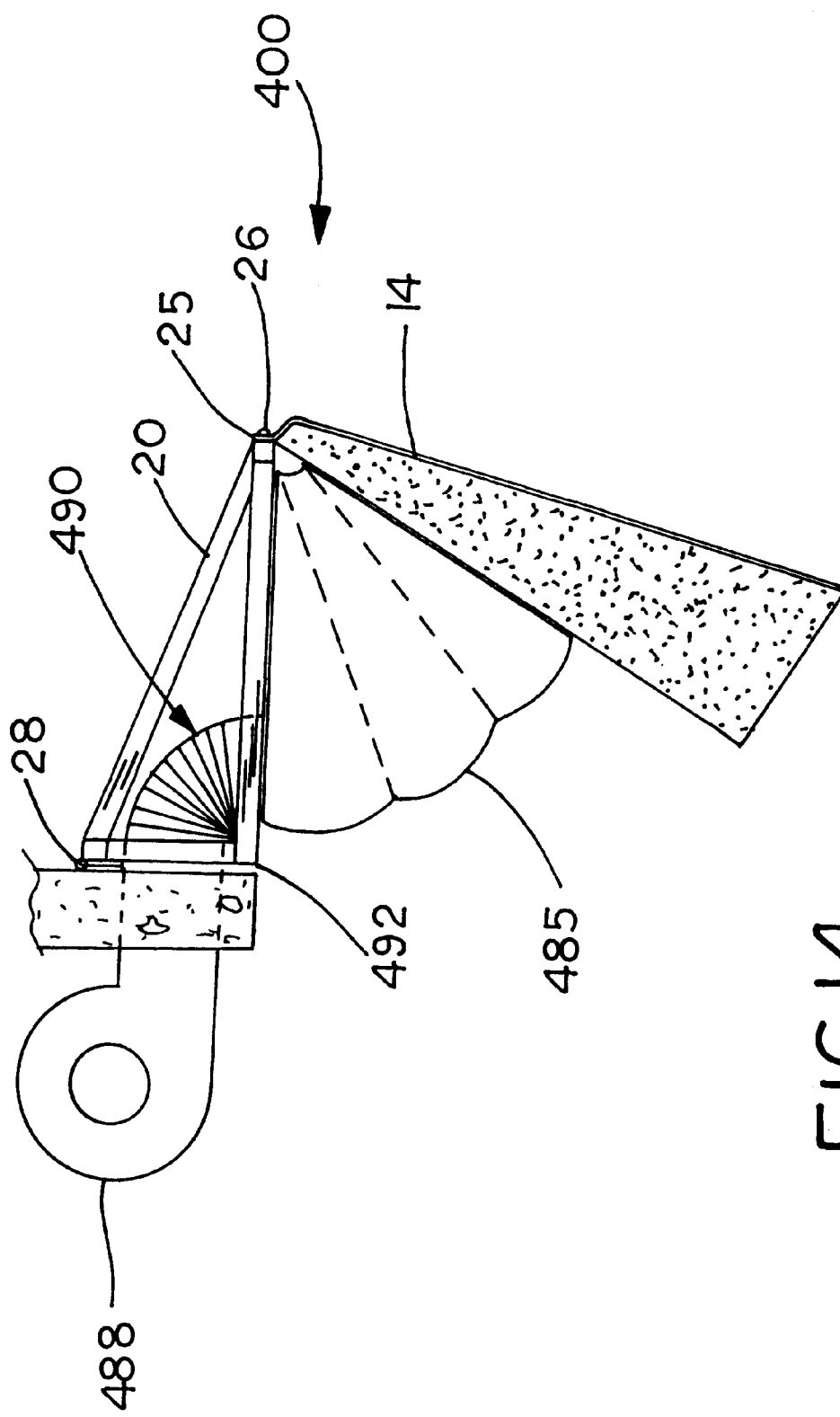
FIG. 14 is a schematic illustration of a cross-section of another sealing apparatus constructed in accordance with the teachings of the invention.

Another alternative sealing apparatus 400 constructed in accordance with the teachings of the invention is shown generally in FIG. 14. The sealing apparatus 400 is similar in many respects to the sealing apparatus 10 shown in FIGS. 1–4. Thus, for brevity of explanation, like parts are labeled with like reference numbers in FIGS. 1–4 and 14, and the descriptions of those like numbered components is not repeated here. Rather, the interested reader is referred to the above-description of the sealing apparatus 10 for a detailed explanation of such parts.

As shown in FIG. 14, the sealing apparatus 400 differs from the sealing apparatus 10 illustrated in FIGS. 1–4 in that it does not include a foam block 32 and spring steel 14. Instead, the sealing apparatus 400 is provided with an air bag 485 mounted to the support 20 and to the proximal side of seal 14. As shown in FIG. 14, the air bag 485 includes an air-flow port in communication with a low pressure blower 488 via a flexible duct 490. A gasket 492 provides a seal between flexible duct 490 and the air bag 485.

Activation of the blower 488 inflates the air bag 485. The inflated air bag 485 provides resistance to proximal deflection of the compressible seal 14 thereby ensuring the seal 14 compresses against the vehicle 2 displacing the seal. Gravity ensures that the seal 14 returns to the first position when the vehicle 2 leaves the parking area.

Activation of the blower 488 can be manual or automatic. In the manual implementation, a manually engageable switch is preferably conveniently located to enable loading dock personnel to provide power to the blower 488 when desired. In the automatic implementation, a sensor is located to change the state of a switch thereby activating the blower 488 when the sensor senses the presence of a vehicle 2 in the parking area. As will be readily appreciated by persons of ordinary skill in the art, the sensor can be implemented in numerous manners without departing from the scope or spirit of the invention. By way of example, not limitation, the sensor can be implemented to sense contact with seal 14 when the seal 14 is deflected distally a predefined distance, or to optically register the presence of a vehicle 2 in the parking area without departing from the scope or spirit of the invention.

Preferably, the air bag 485 includes a plurality of air vents to release pressure when the bag 485 is compressed by the deflected seal 14 thereby preventing ruptures. Although in the preferred embodiment, the air bag 485 is constructed of a reinforced fabric such as vinyl coated cloth, persons of ordinary skill in the art will readily appreciate that other materials might likewise be appropriate in this role. Similarly, although in the preferred embodiment, the low pressure blower 482 is implemented by an axial centrifical squirrel cage blower, it will be appreciated that blowers of other types and constructions could likewise be implemented in this role.

Figure 15:
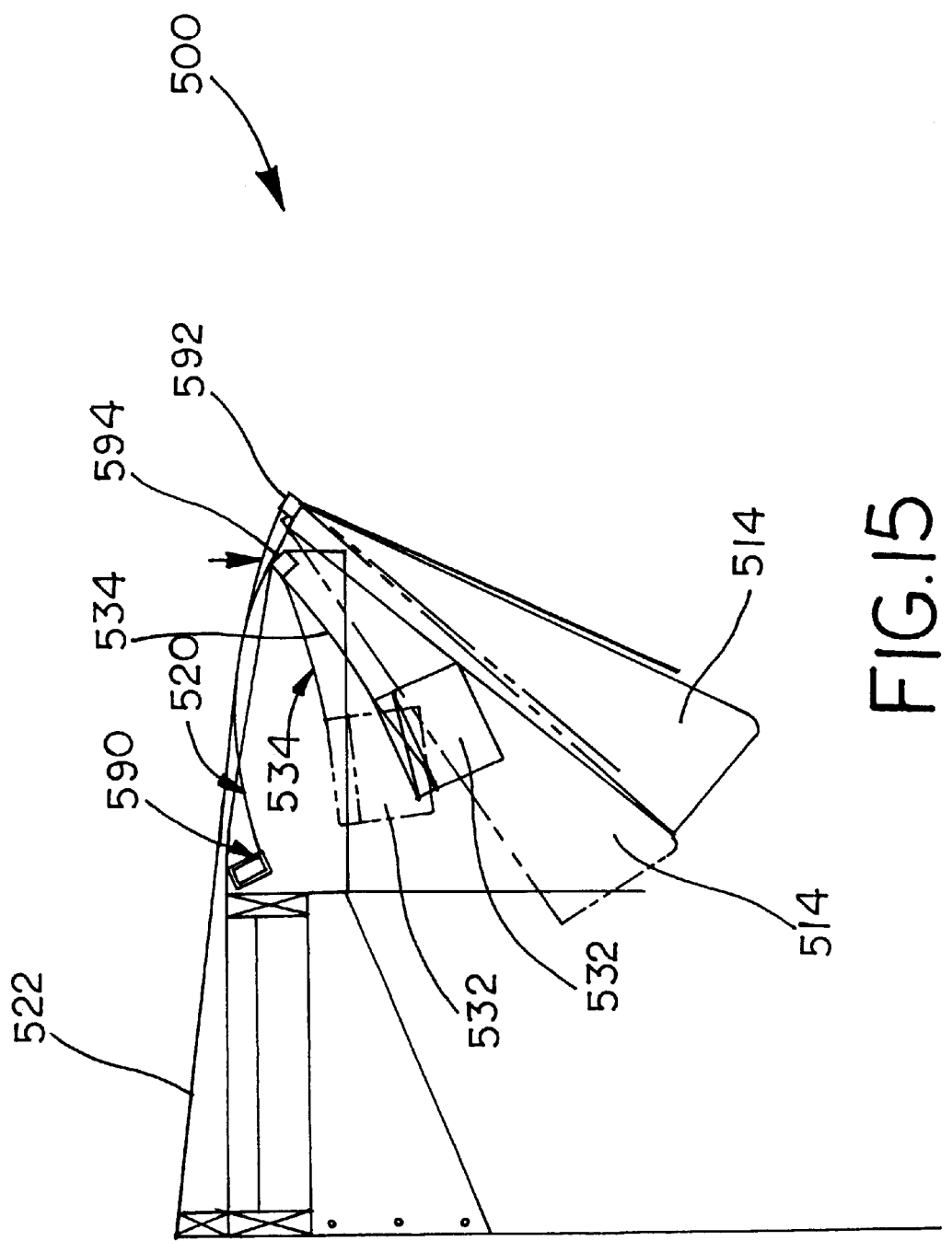
FIG. 15 is a schematic illustration of another sealing apparatus constructed in accordance with the teachings of the invention.

Still another sealing apparatus 500 constructed in accordance with the teachings of the invention is shown in FIG. 15. As with the sealing apparatus 10 discussed in connection with FIGS. 1–4, the sealing apparatus 500 includes a compressible seal 514, and a foam block 532 mounted on spring steel 534 such that the foam block 532 is located behind the seal 514. The foam block 532 and spring steel 524 as well as the compressible seal 514 are preferably constructed like the block 32, spring steel 34 and seal 14 discussed above and will not be further discussed here.

Sealing apparatus 500 differs from the earlier described embodiments in that its support 520 preferably comprises a flexible metal such as spring steel. As shown in FIG. 15, flexible support 520 is mounted at its proximal end to a structure such as a dock seal, dock shelter or building wall via a stationary tube 590. The stationary tube 590 is preferably positioned above the loading dock opening and preferably extends the entire width of the dock.

A flexible tube 592 is located at the distal end of the support 520. The flexible tube 592 also supports the compressible seal 514. Like stationary tube 590, the flexible tube preferably extends the entire dock opening.

In order to locate the support 520 at a predefined rest position, a second stationary tube 594 is provided. Like the other tubes 590, 592, stationary tube 594 preferably extends the length of the dock opening. However, as with the other tubes 590, 592, if desired, other lengths could be employed without departing from the scope of the invention. As shown in FIG. 15, the distal end of the support 520 preferably extends a distance beyond the stationary tube 594.

Spring steel 534, which supports foam block 532, is preferably mounted to tube 594. Furthermore, a flexible fabric cover 522 such as vinyl or hypalon coated cloth is mounted above support 520 to provide further weather protection. Preferably, one end of the cover 522 is mounted to the structure, dock seal, shelter or wall, while the other end is secured to the flexible tube 592.

In operation, when seal 514, the block 532 and spring steel 534 are deflected proximally (as shown in FIG. 15) by a vehicle entering the parking area. The distal end of flexible support 520 flexes around stationary tube 594. Then, when the vehicle leaves the parking area, flexible support 520 flexes upward to relieve the pressure between the seal 514 and the top of the vehicle thereby facilitating exiting of the vehicle. Since cover 522 is made of flexible fabric, it preferably flexes to accommodate the upward movement of support 520.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed is:

1. For use with a structure located adjacent a parking area for vehicles having a top surface, an apparatus comprising:

a support mounted for vertical movement away from the top surface when the vehicle moves away from the structure;

a compressible seal secured to the support, the seal being deflectable from a first position in the path of a vehicle entering the parking area to a second position wherein the seal compresses against the top surface of the vehicle parked in the parking area; and a stiffening member for location between the seal and the structure.

2. An apparatus as defined in claim 1 wherein the vertical movement of the support results from a pivoting movement thereof.

3. An apparatus as defined in claim 1 wherein the support is adapted to remain substantially stationary when the vehicle moves toward the structure.

4. An apparatus as defined in claim 1 wherein the vertical movement of the support relieves pressure between the seal and the top surface to facilitate exiting of the vehicle.

5. An apparatus as defined in claim 1 wherein the seal remains in contact with the vehicle when the support moves away from the top surface.

6. An apparatus as defined in claim 1 wherein the support is mounted to the structure via at least one hinge.

7. An apparatus as defined in claim 1 wherein the support comprises a hood for securement above a dock opening.

8. An apparatus as defined in claim 7 wherein the hood is adapted to be pivotably secured to the structure.

9. An apparatus as defined in claim 1 wherein the support is adapted to be pivotably coupled to the structure indirectly via a portion of a dock seal.

10. An apparatus as defined in claim 1 wherein the support is adapted to be pivotably coupled to the structure indirectly via a portion of a dock shelter.

11. An apparatus as defined in claim 1 wherein the support comprises a first arm having a first end adapted to be pivotably coupled to the structure and a second end secured to the seal.

12. An apparatus as defined in claim 11 further comprising a hood and wherein the first arm is sized to rotate about the first end without contacting the hood.

13. An apparatus as defined in claim 1 wherein the support comprises:
a first arm; and
a second arm pivotably coupled to the first arm, wherein the seal is coupled to the second arm.

14. An apparatus as defined in claim 13 wherein the first arm is adapted to be pivotably coupled to the structure indirectly via a hood.

15. An apparatus as defined in claim 13 wherein the first arm is adapted to be pivotably coupled to the structure indirectly via a portion of a dock seal.

16. An apparatus as defined in claim 13 wherein the first arm is adapted to be pivotably coupled to the structure indirectly via a portion of a dock shelter.

17. An apparatus as defined in claim 1 wherein the seal comprises a foam pad.

18. An apparatus as defined in claim 1 further comprising a sand tube secured to a lower edge of the seal.

19. An apparatus as defined in claim 1 further comprising a resilient member for biasing the seal towards the first position.

20. An apparatus as defined in claim 1 wherein the stiffening member comprises a foam block mounted on spring steel.

21. An apparatus as defined in claim 20 wherein the seal comprises a foam pad.

22. An apparatus as defined in claim 21 wherein the foam block has a higher density than the foam pad.

23. An apparatus as defined in claim 20 wherein the spring steel biases the seal towards the first position via the foam block.

24. An apparatus as defined in claim 1 wherein the stiffening member comprises an inflatable air bag in communication with a blower.

25. An apparatus as defined in claim 1 wherein the support is flexible, and the vertical movement of the support results from a flexing movement of at least a portion of the support.

26. For use with a structure located adjacent a parking area for vehicles having a top surface, an apparatus comprising:
a support;
a seal secured to the support, the seal being deflectable from a first position wherein a vehicle approaching the structure first contacts the seal, to a second position wherein the seal contacts the top surface of the vehicle parked in the parking area; and,
a stiffening member located proximal to the seal, the seal contacting the stiffening member as it deflects from the first position, the stiffening member being distally biased to bias the seal towards the first position.

27. An apparatus as defined in claim 26 wherein the support is mounted for vertical movement away from the top surface when the vehicle moves away from the structure.

28. An apparatus as defined in claim 27 wherein the vertical movement of the support results from a pivoting movement thereof.

29. An apparatus as defined in claim 27 wherein the vertical movement of the support relieves pressure between the seal and the top surface to facilitate exiting of the vehicle.

30. An apparatus as defined in claim 27 wherein the seal remains in contact with the vehicle when the support moves away from the top surface.

31. An apparatus as defined in claim 22 wherein the support is adapted to remain substantially stationary when the vehicle moves toward the structure.

32. An apparatus as defined in claim 28 wherein the support is adapted to be pivotably coupled to the structure indirectly via a portion of a dock seal.

33. An apparatus as defined in claim 28 wherein the support is adapted to be pivotably coupled to the structure indirectly via a portion of a dock shelter.

34. An apparatus as defined in claim 26 wherein the seal comprises a foam pad.

35. An apparatus as defined in claim 26 wherein the stiffening member comprises a foam block mounted on spring steel.

36. An apparatus as defined in claim 35 wherein the seal comprises a foam pad.

37. An apparatus as defined in claim 36 wherein the foam block has a higher density than the foam pad.

38. An apparatus as defined in claim 35 wherein the spring steel biases the seal towards the first position via the foam block.

39. An apparatus as defined in claim 26 wherein the stiffening member comprises an inflatable air bag in communication with a blower.

40. An apparatus as defined in claim 27 wherein the support is flexible, and the vertical movement of the support results from a flexing movement of at least a portion of the support.

41. For use with a structure located adjacent a parking area for vehicles having a top surface, an apparatus comprising:
a support mounted for vertical movement relative to the structure;
a compressible seal secured to the support, the seal being deflectable from a first position in the path of a vehicle entering the parking area to a second position wherein the seal compresses against the top surface of the vehicle parked in the parking area; and,
a foam block located proximal to the seal, the seal contacting the foam block as the seal deflects from the first position, the foam block being distally biased to bias the seal towards the first position.

42. An apparatus as defined in claim 41 wherein the vertical movement of the support results from a pivoting movement thereof.

43. An apparatus as defined in claim 41 wherein the foam block is biased by spring steel upon which it is mounted.

44. An apparatus as defined in claim 42 wherein the support is adapted to pivot away from the top surface when the vehicle moves away from the structure.

45. An apparatus as defined in claim 44 wherein the pivoting of the support relieves pressure between the seal and the top surface to facilitate exiting of the vehicle.

46. An apparatus as defined in claim 44 wherein the seal remains in contact with the vehicle when the support pivots away from the top surface.

47. An apparatus as defined in claim 41 wherein the support is adapted to remain substantially stationary when the vehicle moves toward the structure.

48. An apparatus as defined in claim 41 wherein the support comprises a hood for securement above a dock opening.

49. An apparatus as defined in claim 46 wherein the support is adapted to be pivotably coupled to the structure indirectly via a portion of a dock seal.

50. An apparatus as defined in claim 42 wherein the support is adapted to be pivotably coupled to the structure indirectly via a portion of a dock shelter.

51. An apparatus as defined in claim 41 wherein the seal comprises a foam pad.

52. An apparatus as defined in claim 51 wherein the foam block has a higher density than the foam pad.

53. An apparatus as defined in claim 41 wherein the support is flexible, and the vertical movement of the support results from a flexing movement of at least a portion of the support.

54. For use with a structure located adjacent a parking area for vehicles having a top surface, an apparatus comprising:

a support;

a seal secured to the support, the seal being deflectable from a first position wherein a vehicle approaching the structure first contacts the seal, to a second position wherein the seal contacts the top surface of the vehicle parked in the parking area; and, two phase pressure means for applying a first pressure to the seal until the seal has been deflected beyond a first predetermined distance, and to thereafter apply a second pressure greater than the first pressure to the seal.

55. An apparatus as defined in claim 54 wherein the two phase pressure means comprises a foam block mounted upon spring steel.

56. An apparatus as defined in claim 55 wherein the spring steel applies a substantial portion of the first pressure, and the second pressure is developed by a resistance to deformation of the foam block and a force applied by the spring steel.

57. For use with a structure located adjacent a parking area for vehicles having a top surface, an apparatus comprising:

a support mounted for vertical movement relative to the structure;

a compressible seal secured to the support, the seal being deflectable from a first position in the path of a vehicle entering the parking area to a second position wherein the seal compresses against the top surface of the vehicle parked in the parking area; and, two phase pressure means for applying a first pressure to the seal until the seal has been deflected beyond a first predetermined distance, and to thereafter apply a second pressure greater than the first pressure to the seal.

58. An apparatus as defined in claim 52 wherein the two phase pressure means comprises a foam block mounted upon spring steel.

59. An apparatus as defined in claim 58 wherein the spring steel applies a substantial portion of the first pressure, and the second pressure is developed by a resistance to deformation of the foam block and a force applied by the spring steel.

60. For use with a structure located adjacent a parking area for vehicles having a top surface, an apparatus comprising:

a support mounted for vertical movement away from the top surface when the vehicle moves away from the structure; and, a compressible seal secured to the support, the seal being deflectable from a first position in the path of a vehicle entering the parking area to a second position wherein the seal compresses against the top surface of the vehicle parked in the parking area, wherein the support is adapted to remain substantially stationary when the vehicle moves toward the structure to engage the seal.

61. For use with a vehicle having a top surface, an apparatus comprising:

a rigid hood adapted to be secured to a structure above a dock opening located adjacent a parking area for the vehicle, the hood adapted to be pivotably mounted to the structure via a hinge for movement away from the top surface when the vehicle moves away from the structure; and, a compressible seal secured to the hood, the seal being deflectable from a first position in the path of a vehicle entering the parking area to a second position wherein the seal compresses against the top surface of the vehicle parked in the parking area.

* * * * *